(12) United States Patent
Jesewitz et al.

(10) Patent No.: US 12,208,875 B2
(45) Date of Patent: *Jan. 28, 2025

(54) AXIAL FLUX PROPULSION SYSTEM FOR AN ELECTRIC BOAT

(71) Applicant: EVOA, LLC, Orlando, FL (US)

(72) Inventors: Raymond L. Jesewitz, Apopka, FL (US); Michael J. Anderson, Orlando, FL (US)

(73) Assignee: EVOA, LLC, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,805

(22) Filed: Mar. 14, 2024

(65) Prior Publication Data

US 2024/0217640 A1 Jul. 4, 2024

Related U.S. Application Data

(63) Continuation of application No. 17/337,991, filed on Jun. 3, 2021, now Pat. No. 11,932,367.

(60) Provisional application No. 63/034,509, filed on Jun. 4, 2020.

(51) Int. Cl.
| | |
|---|---|
| *B63H 20/14* | (2006.01) |
| *B60L 50/60* | (2019.01) |
| *B60L 53/20* | (2019.01) |
| *B60L 58/26* | (2019.01) |
| *B63H 20/28* | (2006.01) |
| *B63H 21/17* | (2006.01) |
| *B63H 23/34* | (2006.01) |

(52) U.S. Cl.
CPC .............. *B63H 20/14* (2013.01); *B60L 50/66* (2019.02); *B60L 53/20* (2019.02); *B60L 58/26* (2019.02); *B63H 20/28* (2013.01); *B63H 21/17* (2013.01); *B63H 23/34* (2013.01); *B60L 2200/32* (2013.01); *B60L 2250/00* (2013.01)

(58) Field of Classification Search
CPC ........ B63H 20/14; B63H 20/28; B63H 21/17; B63H 23/34; B60L 53/20; B60L 50/66; B60L 58/26; B60L 2200/32; B60L 2250/00
See application file for complete search history.

(56) References Cited

U.S. PATENT DOCUMENTS

| | | | |
|---|---|---|---|
| 1,534,725 A | 4/1925 | Macmillan | |
| 4,764,136 A | 8/1988 | Johansson | |
| 4,832,630 A * | 5/1989 | Alexander, Jr. ........ | H02K 7/116 475/264 |

(Continued)

FOREIGN PATENT DOCUMENTS

| | | |
|---|---|---|
| CN | 205149553 U | 4/2016 |
| WO | 2010066248 A3 | 8/2010 |

OTHER PUBLICATIONS

Non-Final Office Action in U.S. Appl. No. 17/337,991, mailed Sep. 21, 2023, 8 pages.

(Continued)

*Primary Examiner* — Stephen P Avila
(74) *Attorney, Agent, or Firm* — Lewis Rice LLC

(57) ABSTRACT

Axial Flux Outboard Propulsion System for an Electric Boat having a first axial flux motor that is positioned adjacent to a second axial flux motor and the ability to selectively turn each motor on or off via the control system based on the request or need for torque.

20 Claims, 15 Drawing Sheets

(56) References Cited

U.S. PATENT DOCUMENTS

| | | |
|---|---|---|
| 5,109,172 A | 4/1992 | Pace |
| 5,229,677 A | 7/1993 | Dade et al. |
| 5,684,690 A | 11/1997 | Levedahl |
| 6,396,161 B1 | 5/2002 | Crecelius et al. |
| 8,118,627 B2 | 2/2012 | Wejrzanowski et al. |
| 8,298,023 B2 | 10/2012 | Daikoku |
| 8,535,104 B1 | 9/2013 | Nida |
| 8,608,521 B1 | 12/2013 | Snyder et al. |
| 8,682,516 B1 | 3/2014 | Balogh et al. |
| 8,725,329 B1 | 5/2014 | Snyder et al. |
| 8,808,139 B1 | 8/2014 | Arbuckle et al. |
| 8,992,274 B1 | 3/2015 | Ward et al. |
| 9,028,285 B2 | 5/2015 | Tamba |
| 9,321,516 B1 | 4/2016 | Lafreniere et al. |
| 9,533,747 B2 | 1/2017 | Arbuckle et al. |
| 11,772,768 B1 | 10/2023 | Jesewitz et al. |
| 11,932,367 B1 * | 3/2024 | Jesewitz .............. B63H 20/007 |
| 2007/0152626 A1 | 7/2007 | Boebel |
| 2009/0209146 A1 | 8/2009 | Jegel |
| 2010/0285702 A1 | 11/2010 | Platon |
| 2012/0083173 A1 | 4/2012 | McMillan |
| 2013/0233230 A1 | 9/2013 | Rohden |
| 2018/0208290 A1 | 7/2018 | Biebach |
| 2020/0062361 A1 | 2/2020 | Nakamura |
| 2022/0169349 A1 | 6/2022 | Jesewitz et al. |

OTHER PUBLICATIONS

Non-Final Office Action in U.S. Appl. No. 18/375,100, mailed Apr. 8, 2024, 7 pages.

Office Action in Canadian Application No. 3,147,937, mailed Feb. 20, 2024, 5 pages.

* cited by examiner

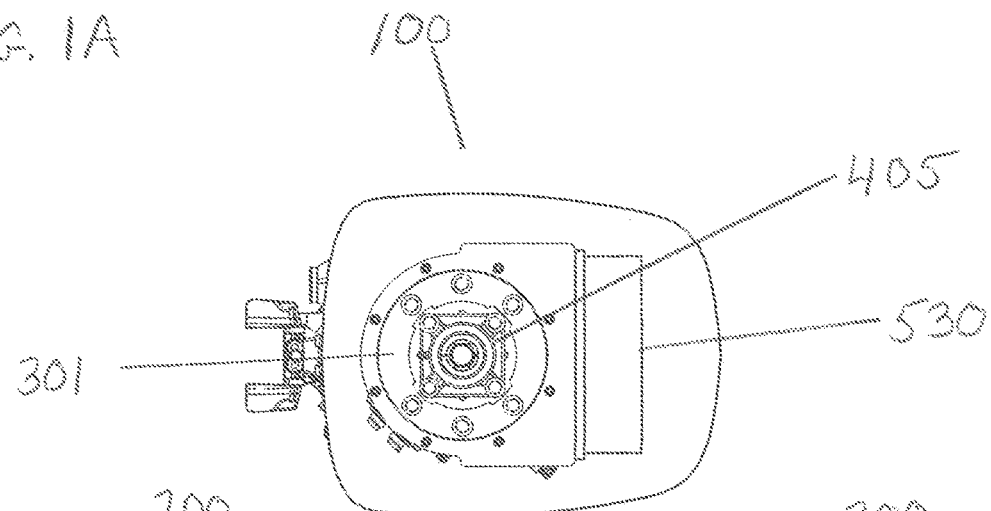
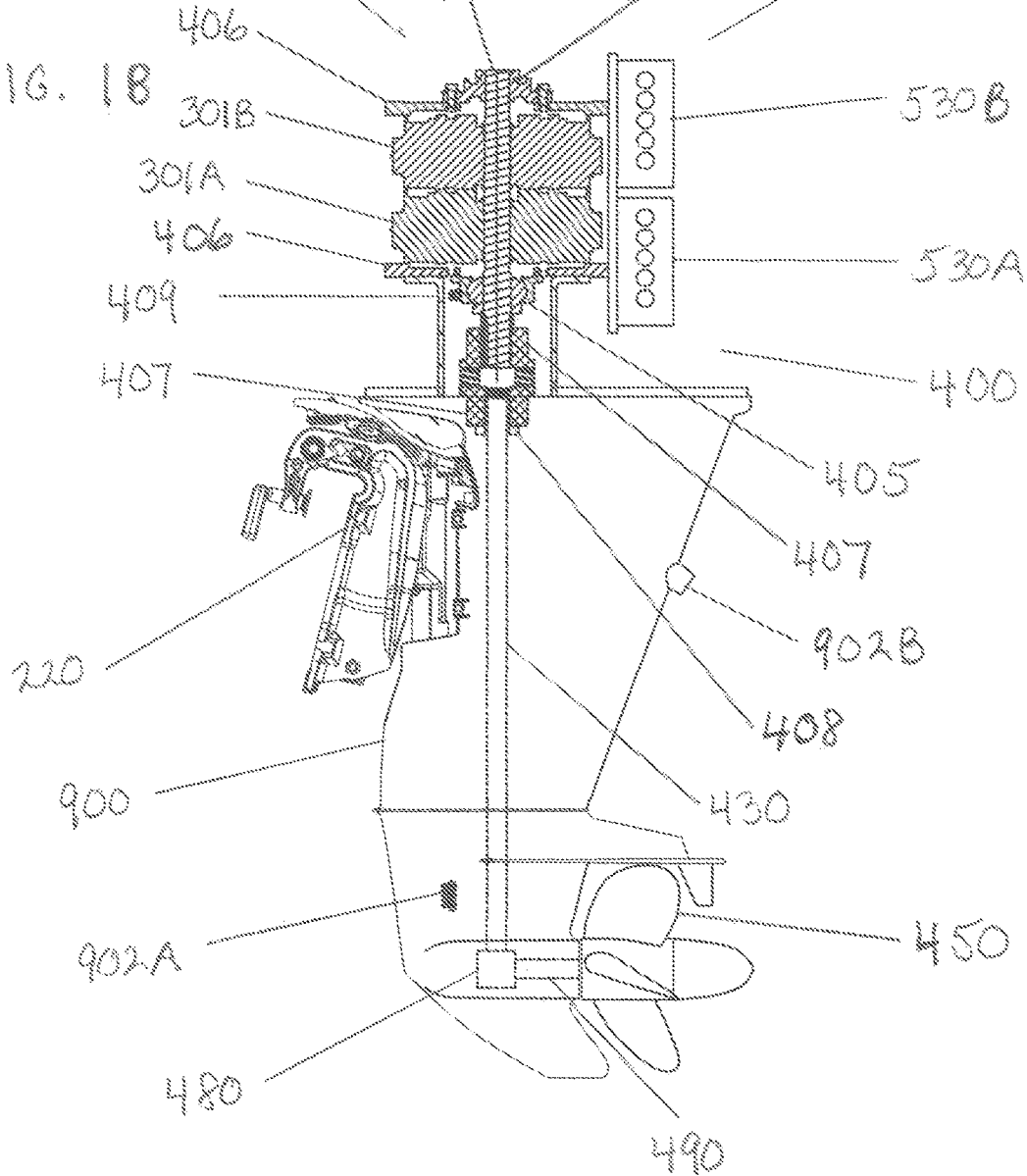

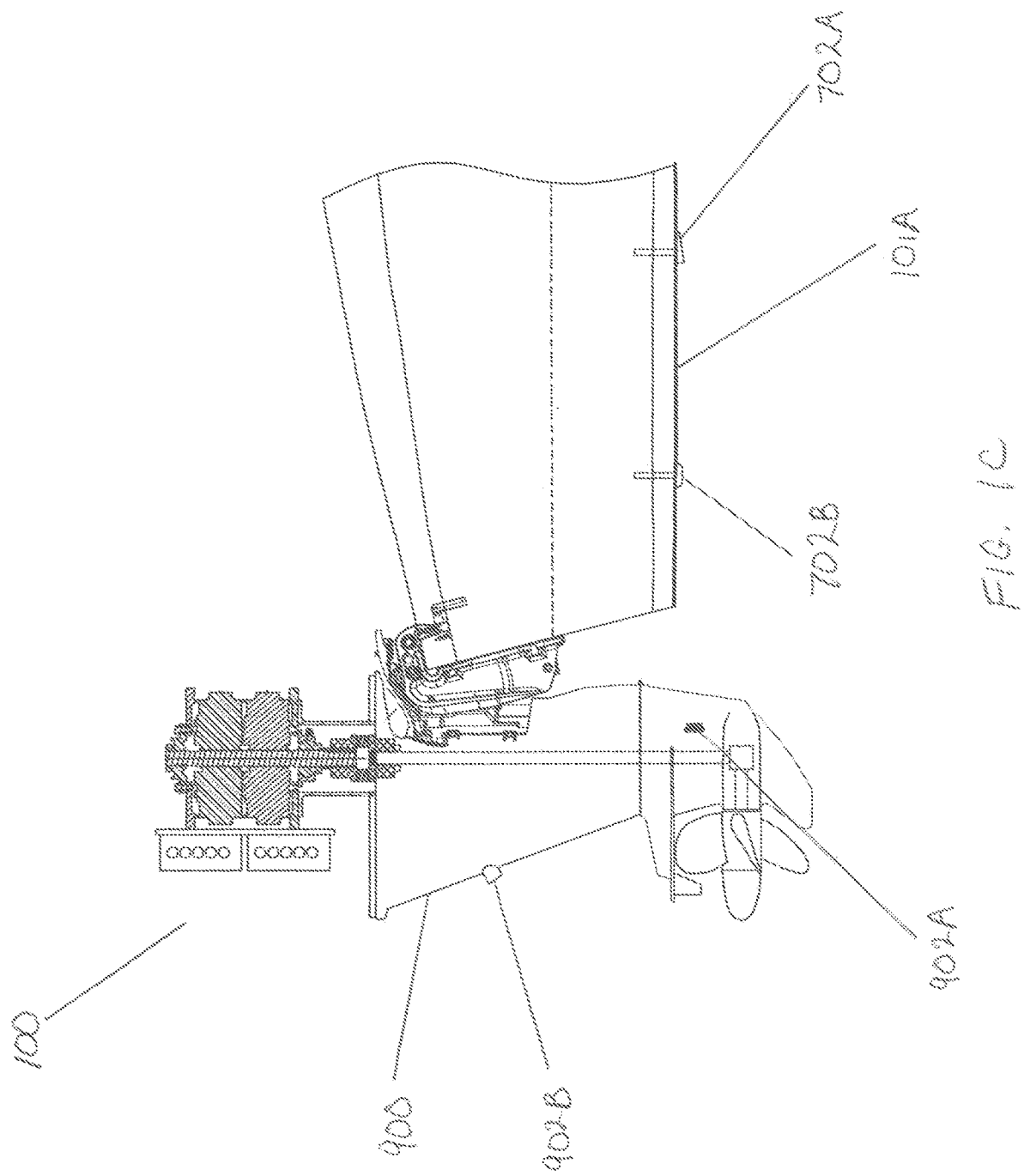

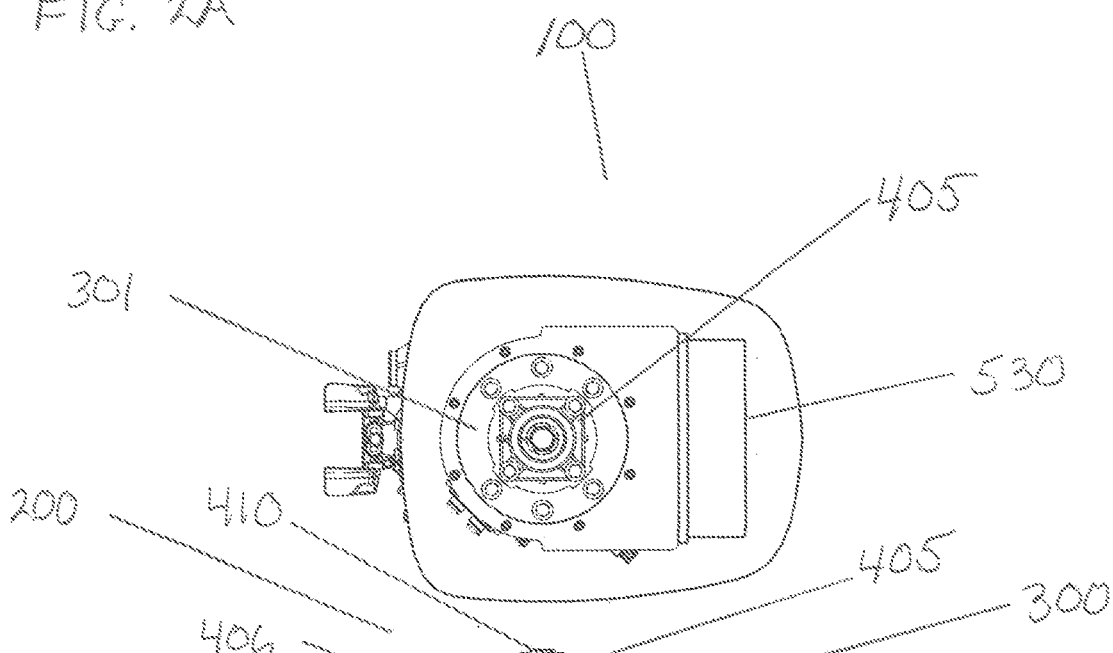
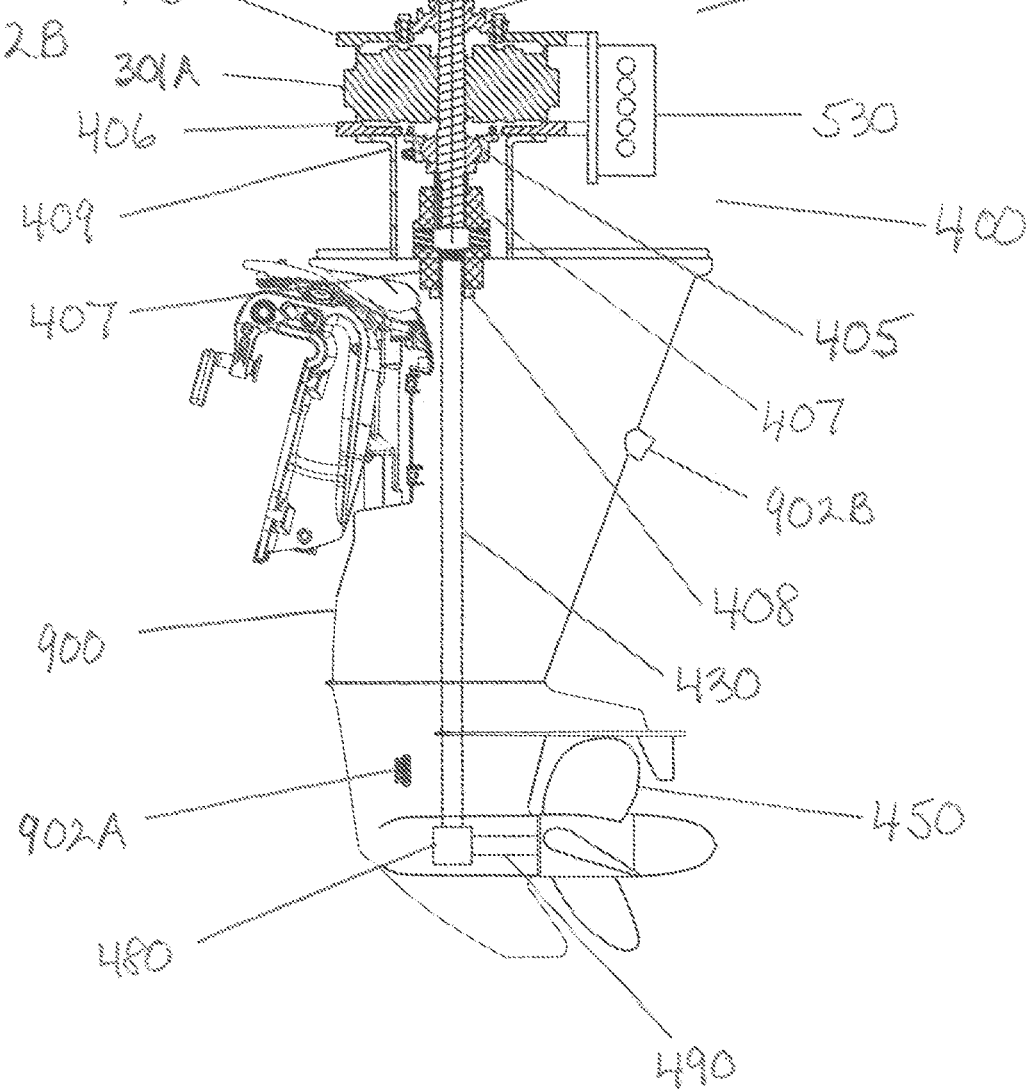

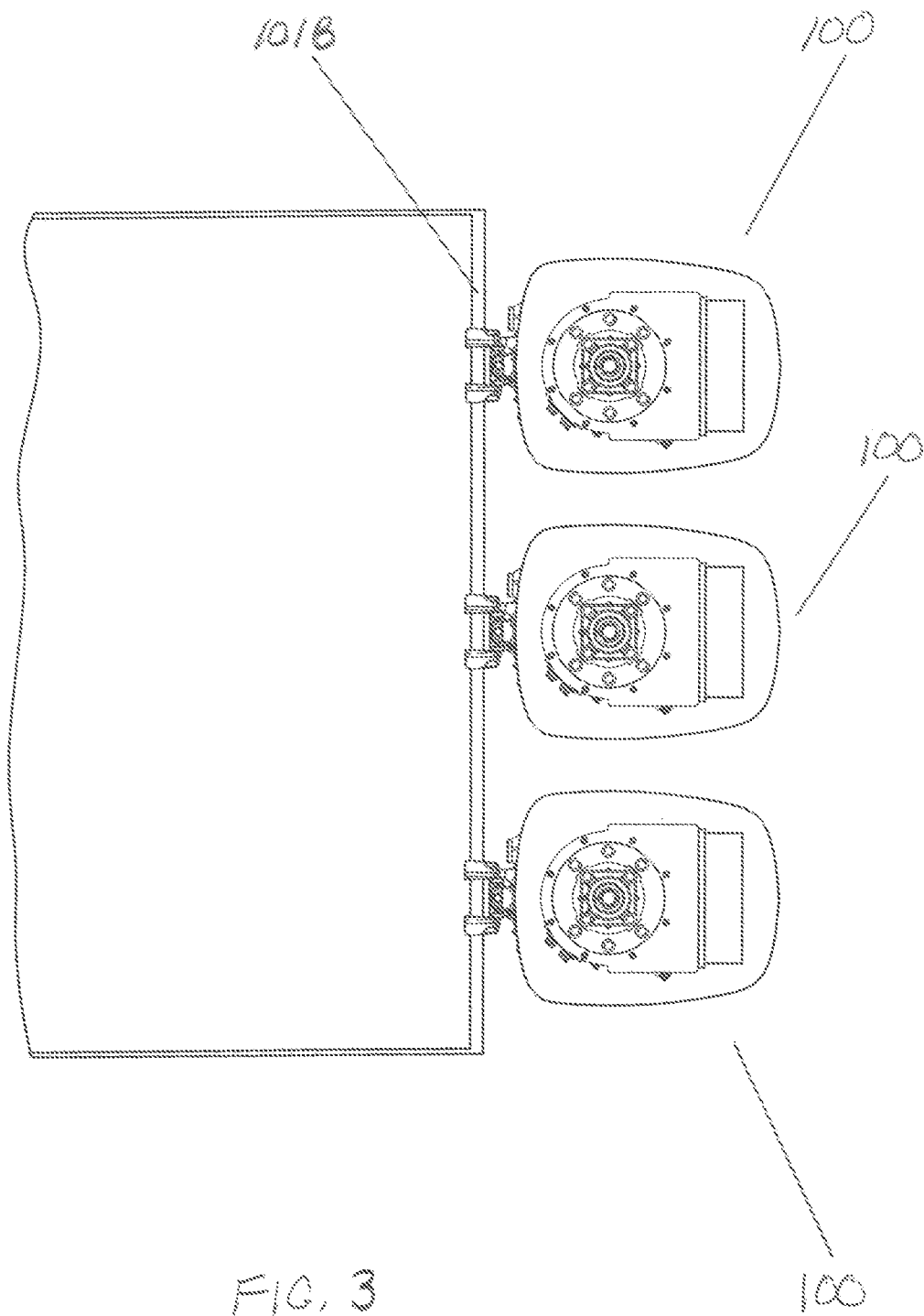

| AXIAL FLUX MOTOR - OPERATION MODES | |
|---|---|
| OUTBOARD | |
| OPERATION MODE | 100% ELECTRIC |
| 1. IN NEUTRAL - READY STATE | (T0) |
| ICE | NONE |
| CLUTCH 1 | NONE |
| CLUTCH 2 | NONE |
| MOTOR 1 - TRACTION/ GEN | OFF |
| MOTOR 2 - TRACTION/ GEN | OFF |
| MOTOR 3 - TRACTION | OFF |
| MOTOR 4 - TRACTION | OFF |
| MOTOR 5 - TRACTION | OFF |
| BATTERY STATE | STEADY |
| 2. IDLE SPEED (< 5 mph) | (T1) |
| ICE | NONE |
| CLUTCH 1 | NONE |
| CLUTCH 2 | NONE |
| MOTOR 1 - TRACTION/ GEN | TRACTION ON |
| MOTOR 2 - TRACTION/ GEN | TRACTION OFF |
| MOTOR 3 - TRACTION | OFF |
| MOTOR 4 - TRACTION | OFF |
| MOTOR 5 - TRACTION | OFF |
| BATTERY STATE | DISCHARGING |
| 3. ACCELERATION (0 - 60 mph) | (T2) |
| ICE | NONE |
| CLUTCH 1 | NONE |
| CLUTCH 2 | NONE |
| MOTOR 1 - TRACTION/ GEN | TRACTION ON |
| MOTOR 2 - TRACTION/ GEN | TRACTION ON |
| MOTOR 3 - TRACTION | TRACTION ON |
| MOTOR 4 - TRACTION | TRACTION ON |
| MOTOR 5 - TRACTION | TRACTION ON |
| BATTERY STATE | DISCHARGING |

FIG. 9A

| AXIAL FLUX MOTOR - OPERATION MODES | | | | | | | | | |
|---|---|---|---|---|---|---|---|---|---|
| OUTBOARD | | | | | | | | | |
| OPERATION MODE | 100% ELECTRIC | | | | | | | | |
| | | | | | | | | | |
| 4. TROLLING MODE | (T3) | | | | | | | | |
| (all electric ~10 mph) | | | | | | | | | |
| ICE | NONE | | | | | | | | |
| CLUTCH 1 | NONE | | | | | | | | |
| CLUTCH2 | NONE | | | | | | | | |
| MOTOR 1-TRACTION/ GEN | TRACTION ON | | | | | | | | |
| MOTOR 2 - TRACTION/ GEN | TRACTION ON | | | | | | | | |
| MOTOR 3 - TRACTION | OFF | | | | | | | | |
| MOTOR 4 - TRACTION | OFF | | | | | | | | |
| MOTOR 5 - TRACTION | OFF | | | | | | | | |
| BATTERY STATE | DISCHARGING | | | | | | | | |
| 5. TROLLING MODE II (NA) | (T3) | | | | | | | | |
| (~10 mph) | | | | | | | | | |
| ICE | NONE | | | | | | | | |
| CLUTCH 1 | NONE | | | | | | | | |
| CLUTCH2 | NONE | | | | | | | | |
| MOTOR 1-TRACTION/ GEN | TRACTION ON | | | | | | | | |
| MOTOR 2 - TRACTION/ GEN | TRACTION ON | | | | | | | | |
| MOTOR 3 - TRACTION | OFF | | | | | | | | |
| MOTOR 4 - TRACTION | OFF | | | | | | | | |
| MOTOR 5 - TRACTION | OFF | | | | | | | | |
| BATTERY STATE | DISCHARGING | | | | | | | | |
| 6. Wakeboard/Tube Mode(N/T3) | | | | | | | | | |
| (~22 mph) | | | | | | | | | |
| ICE | NONE | | | | | | | | |
| CLUTCH 1 | NONE | | | | | | | | |
| CLUTCH2 | NONE | | | | | | | | |
| MOTOR 1-TRACTION/ GEN | TRACTION ON | | | | | | | | |
| MOTOR 2 - TRACTION/ GEN | TRACTION ON | | | | | | | | |
| MOTOR 3 - TRACTION | OFF | | | | | | | | |
| MOTOR 4 - TRACTION | OFF | | | | | | | | |
| MOTOR 5 - TRACTION | OFF | | | | | | | | |
| BATTERY STATE | DISCHARGING | | | | | | | | |

FIG. 9B

| | AXIAL FLUX MOTOR - OPERATION MODES | | | | | | |
|---|---|---|---|---|---|---|---|
| *OUTBOARD* | | | | | | | |
| OPERATION MODE | 100% ELECTRIC | | | | | | |
| 7. CRUISE MODE - | (T2) | | | | | | |
| (23+ mph) | | | | | | | |
| ICE | NONE | | | | | | |
| CLUTCH 1 | NONE | | | | | | |
| CLUTCH2 | NONE | | | | | | |
| MOTOR 1-TRACTION/ GEN | TRACTION ON | | | | | | |
| MOTOR 2 - TRACTION/ GEN | TRACTION ON | | | | | | |
| MOTOR 3 - TRACTION | OFF | | | | | | |
| MOTOR 4 - TRACTION | OFF | | | | | | |
| MOTOR 5 - TRACTION | OFF | | | | | | |
| BATTERY STATE | DISCHARGING | | | | | | |
| | | | | | | | |
| 8. WIDE OPEN THROTTLE - | (T2) | | | | | | |
| (WOT) | | | | | | | |
| ICE | NONE | | | | | | |
| CLUTCH 1 | NONE | | | | | | |
| CLUTCH2 | NONE | | | | | | |
| MOTOR 1-TRACTION/ GEN | TRACTION ON | | | | | | |
| MOTOR 2 - TRACTION/ GEN | TRACTION ON | | | | | | |
| MOTOR 3 - TRACTION | TRACTION ON | | | | | | |
| MOTOR 4 - TRACTION | TRACTION ON | | | | | | |
| MOTOR 5 - TRACTION | TRACTION ON | | | | | | |
| BATTERY STATE | DISCHARGING | | | | | | |

FIG. 9C

AXIAL FLUX PROPULSION SYSTEM FOR AN ELECTRIC BOAT

CROSS REFERENCE TO RELATED APPLICATIONS

This application is a continuation of U.S. patent application Ser. No. 17/337,991, filed Jun. 3, 2021, issued as U.S. Pat. No. 11,932,367, which application claims the benefit of U.S. Provisional Patent Application Ser. No. 63/034,509, filed Jun. 4, 2020. The entire disclosure all of which are incorporated herein by reference.

FIELD OF THE APPARATUS AND METHOD

The invention relates to the field of electrically propelled boats.

BACKGROUND OF THE INVENTION

Axial Flux motors have been known and used for decades as shown, for example, in U.S. Pat. No. 5,109,172 which is titled "Permanent Magnet Motor Having Diverting Magnets", which was issued in April 1992.

Early use of axial flux in devices was primarily as sensors (such as transducers). As more powerful axial flux devices were developed, Axial Flux motors were created and deployed. While Axial Flux motors have been found in propulsion systems used for trolling, these calm water trolling propulsion configurations are inadequate for Sports Boating (such as skiing or wakeboarding) due primarily to the instant demand for high output torque and extended high torque demands not typical of trolling.

Prior use of Axial Flux motors in marine propulsion includes for example, U.S. Pat. No. 5,229,677 titled "Electric Propulsion Motor for Marine Vehicles" issued July 1993. This device uses a pair of axial flux motors position on individual shafts wherein the motors rotate opposite of each other to drive counter rotating propellers.

Axial Flux motor elements have been applied to Marine applications in conjunction with Internal Combustion Engines such as in alternator configurations (see U.S. Pat. No. 5,530,305, titled "Marine Engine Alternator Construction", issued June 1996) where magnets are attached to a flywheel which rotates as the crankshaft rotates thereby the flywheel generates electricity. In this configuration the Axial Flux is used to generate electricity but does not impart propulsion torque to the propeller.

Axial Flux electric motors (see U.S. Pat. No. 5,607,329 titled Integrated Motor/Marine Propulsor with Permanent Magnet Blades", issued March 1997) have been used in marine propulsion systems to drive (propeller) rotor blades and directly which no mechanical integration with an Internal Combustion Engine.

Further, it is known that axial flux motor/generators provide more power and flux density, due to smaller size and the alignment of the rotor and stator coils as well as the flux field generator, than radial flux motors.

BRIEF SUMMARY OF THE INVENTION

It is an object of the invention to provide an axial flux outboard propulsion system for an electric boat.

It is further an object of the invention to provide a 100% electric boat having an axial flux outboard propulsion system.

While the use of a clutch to engage and disengage electric axial flux motors and electrical axial flux motor/generators is known, the instant invention provides a unique marine use of electric axial flux motor/generator configurations which can provide their own internal clutching functionality by selectively engaging and or disengaging from a drive or transmission shaft. Further, by enabling or disabling selected axial flux motors, the motors can be placed in various operational states such as disabled AND disengaged, or enabled AND disengaged, or enabled AND engaged. These motor states correspond to the various operating modes as further provided herein.

Further, the instant invention provides a unique sequence of engaging and disengaging the electric axial flux motors and electrical axial flux motor/generators based on desired performance criteria.

With the proliferation of various electric vehicle charging stations and charging equipment, the axial flux outboard propulsions system for an electric boat of the instant invention is presented with ever-widening charging options.

Other novel features which are characteristic of the apparatus, as to organization and method of operation, together with further objects and advantages thereof are better understood from the following description considered in connection with the accompanying figures and claims but is not intended as a definition of the limits of the apparatus.

BRIEF DESCRIPTION OF THE DRAWINGS

The apparatus will be better understood when consideration is given to the following detailed description thereof.

FIG. 1A presents a top view of a preferred embodiment of the axial flux outboard boat propulsion system.

FIG. 1B presents a side view of a preferred embodiment of the axial flux outboard boat propulsion system.

FIG. 1C presents a side view of a preferred embodiment of the axial flux outboard boat propulsion system.

FIG. 2A presents a top view of an alternate embodiment of the axial flux outboard boat propulsion system.

FIG. 2B presents a side view of an alternate embodiment of the axial flux outboard boat propulsion system.

FIG. 3 presents a top view of an outboard boat having multiple Axial Flux Propulsion Systems of the present invention.

FIG. 9A presents operating modes of the axial flux outboard propulsion system.

FIG. 9B presents operating modes of the axial flux outboard propulsion system.

FIG. 9C presents operating modes of the axial flux outboard propulsion system.

DETAILED DESCRIPTION OF THE INVENTION

Figure 1D:
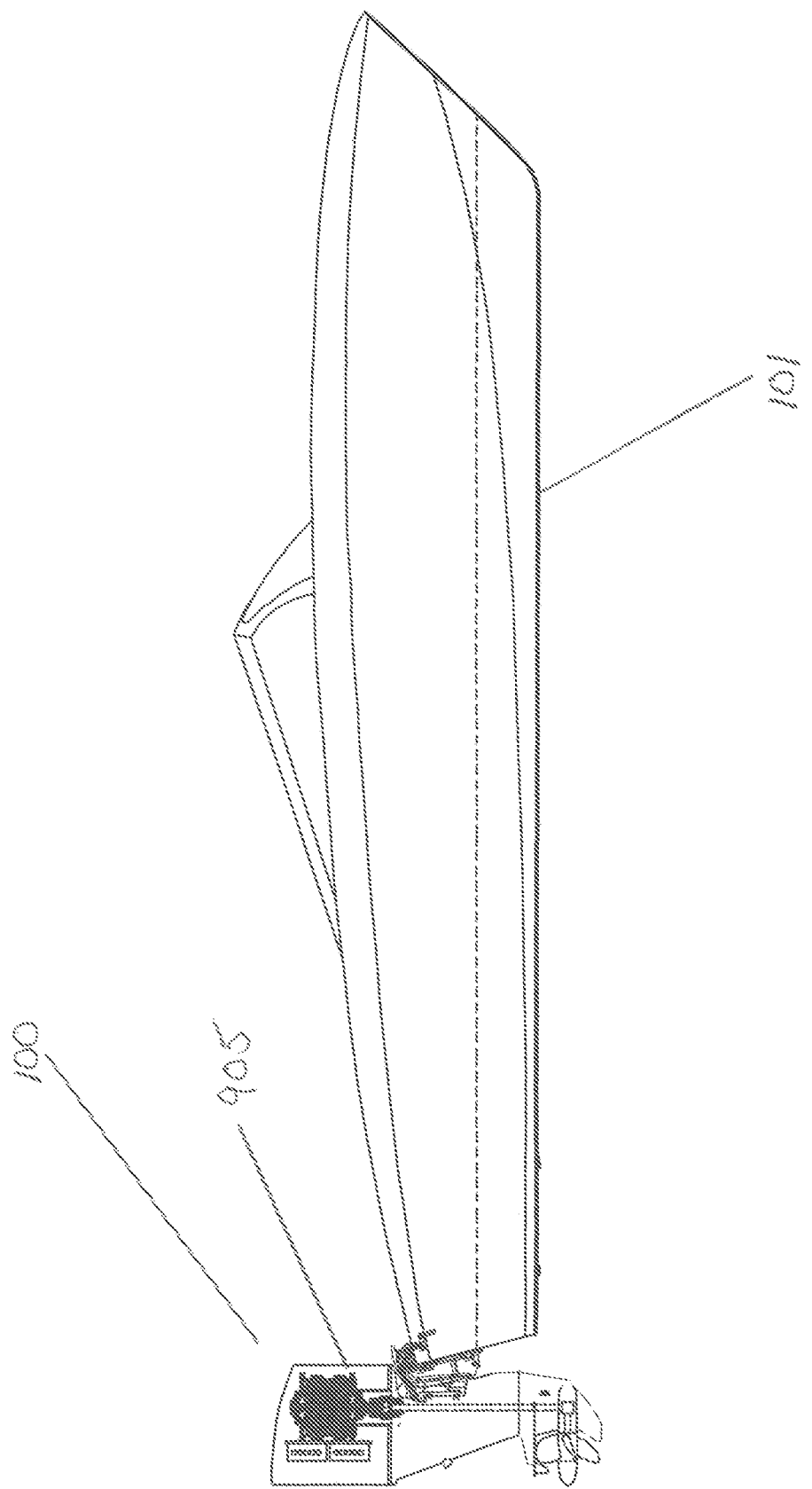
FIG. 1D presents a side view of a preferred embodiment of the axial flux outboard boat propulsion system.
Figure 4:
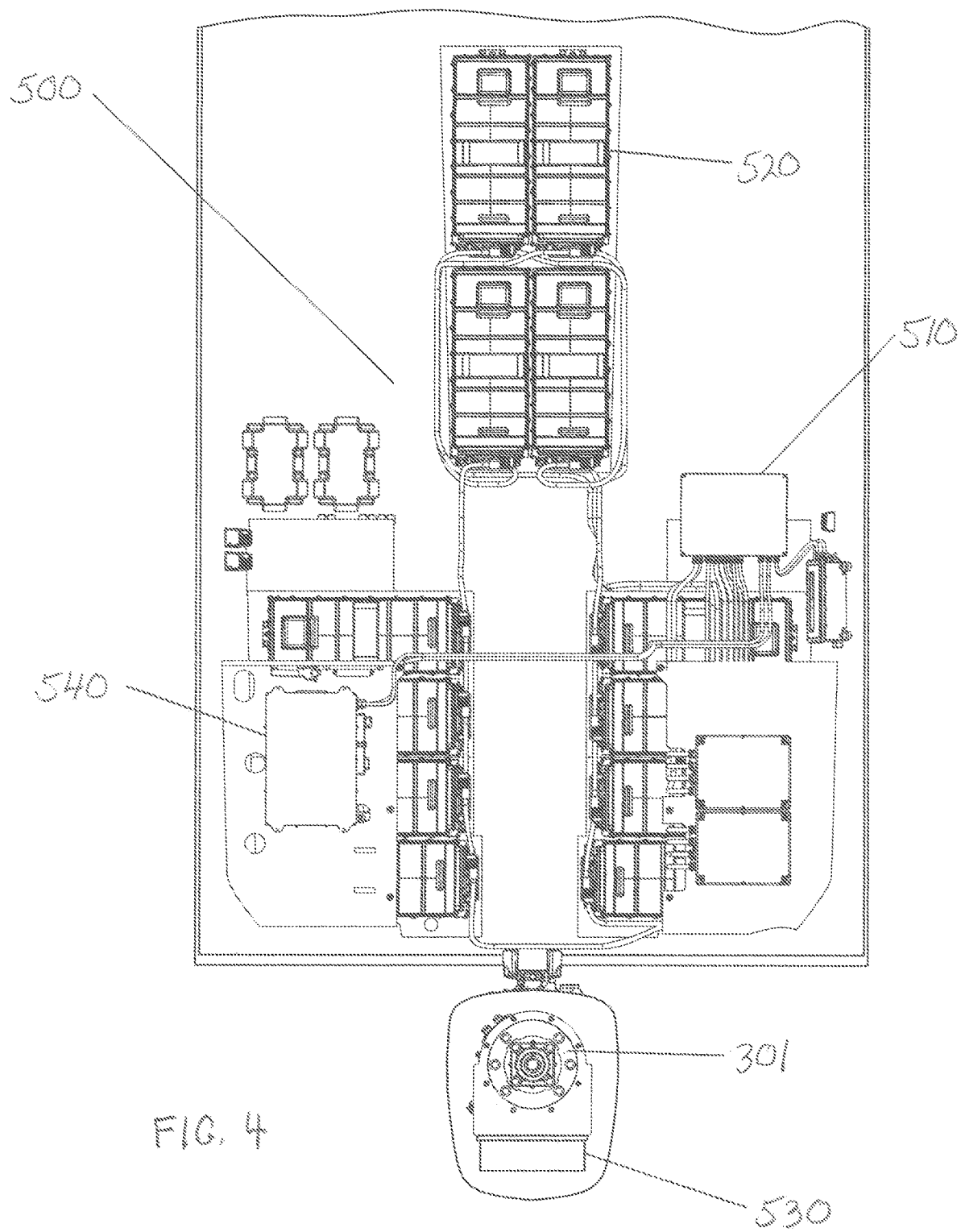
FIG. 4 presents a top view of an outboard boat electrical power distribution system of the present invention.

The instant invention presented in FIG. 1-10 provides a preferred embodiment and exemplary alternate embodiments of an Axial Flux Outboard Propulsion System 100 for an Electric Boat (101). As shown at least in FIGS. 1A, 1B, 2A, and 2B in overall operation, a traction system (300), is supported within a Leg (900) and the traction system (300), via the transmission system (400) imparts force to a propeller (450) which produces thrust when the propeller (450) is submerged in a liquid (such as water) thereby propelling the boat (101).

Specifically, in the preferred embodiment, as shown in FIG. 1A-FIG. 1D, presents an Axial Flux Outboard Propulsion System 100 for attachment to a boat hull (101A), such as via a boat transom (101B) to provide propulsion to the boat (101).

Attachment to the boat is provided by a mounting system (200) for supporting components of the outboard propulsion system, the mounting system (200) including a transom mount bracket (220) configured for attachment to the boat transom (101B).

A transmission system (400) for transmitting torque, is coupled to the axial flux motor/generator (301). The transmission system (400) includes an upper drive shaft (430), and a propeller (450). The transmission system (400) may also include a gearbox (480) coupled to the propeller (450) to modify the propeller rotations. A propeller drive shaft (490) may be provided between the gearbox (480) and the propeller (450). Thrust bearings (not shown) may be provided to couple transmission system elements together as needed.

The Axial Flux Outboard Propulsion System 100 subsystems, as shown in FIG. 4-FIG. 6B, includes an electrical power distribution system (500) for storing and distributing electrical power which includes at least one battery (520) [preferably a 12 volt (or other voltage) battery as well as a high voltage (HV) battery pack]. The electrical power distribution system further includes a battery charger, and a power distribution unit (PDU), as well as electricity conversion components such as a DC/DC converter.

An inverter (530) is associated with each axial flux motor/generator (301) to help ensure the appropriate electricity is being used by the axial flux motor/generator (301). Further, each axial flux motor/generator (301) may have a specific designated inverter (530A, 530B) or multiple axial flux motor/generators may be controlled from a single invertor (530) or a component having electronic inverter functionality.

Figure 5:
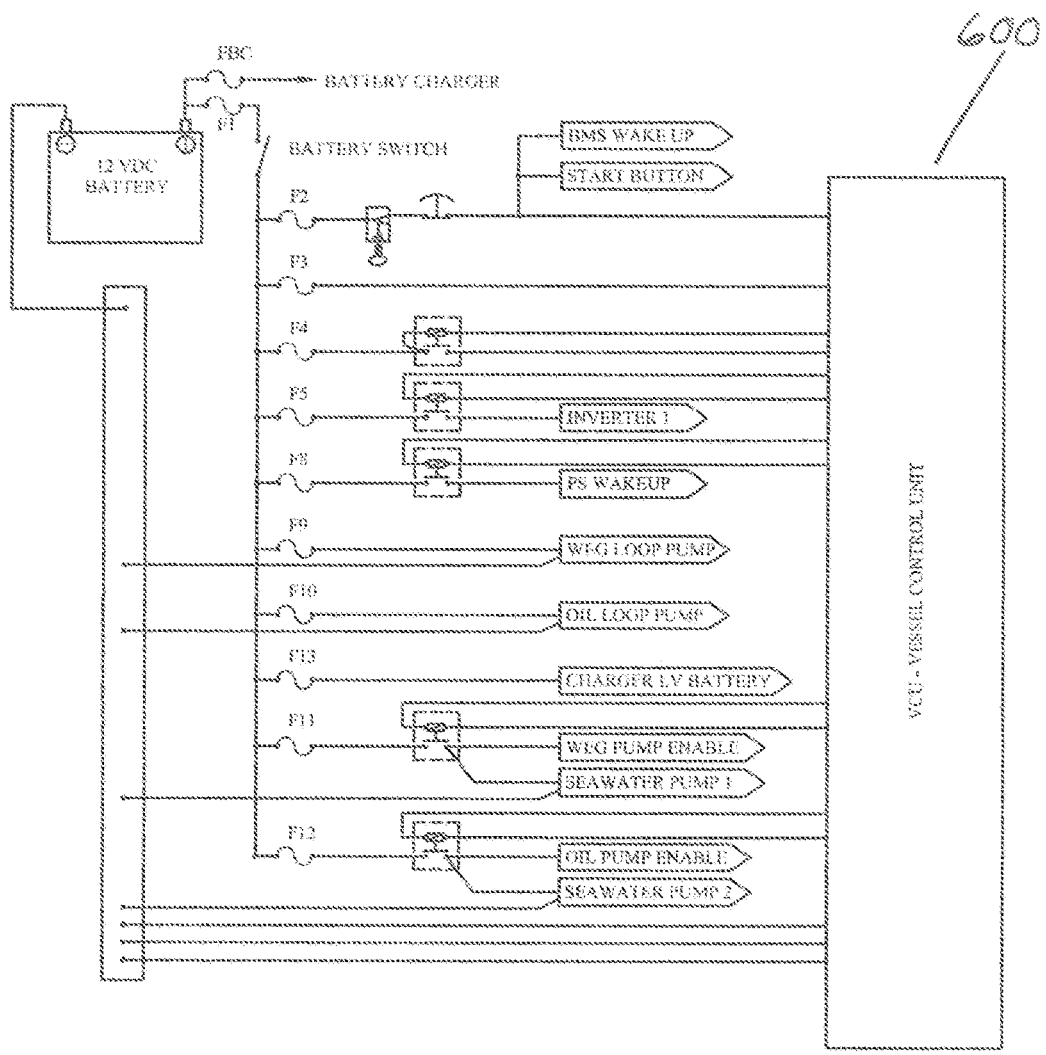
FIG. 5 presents a diagram of an outboard boat electrical power distribution system of the present invention.
Figure 6A:
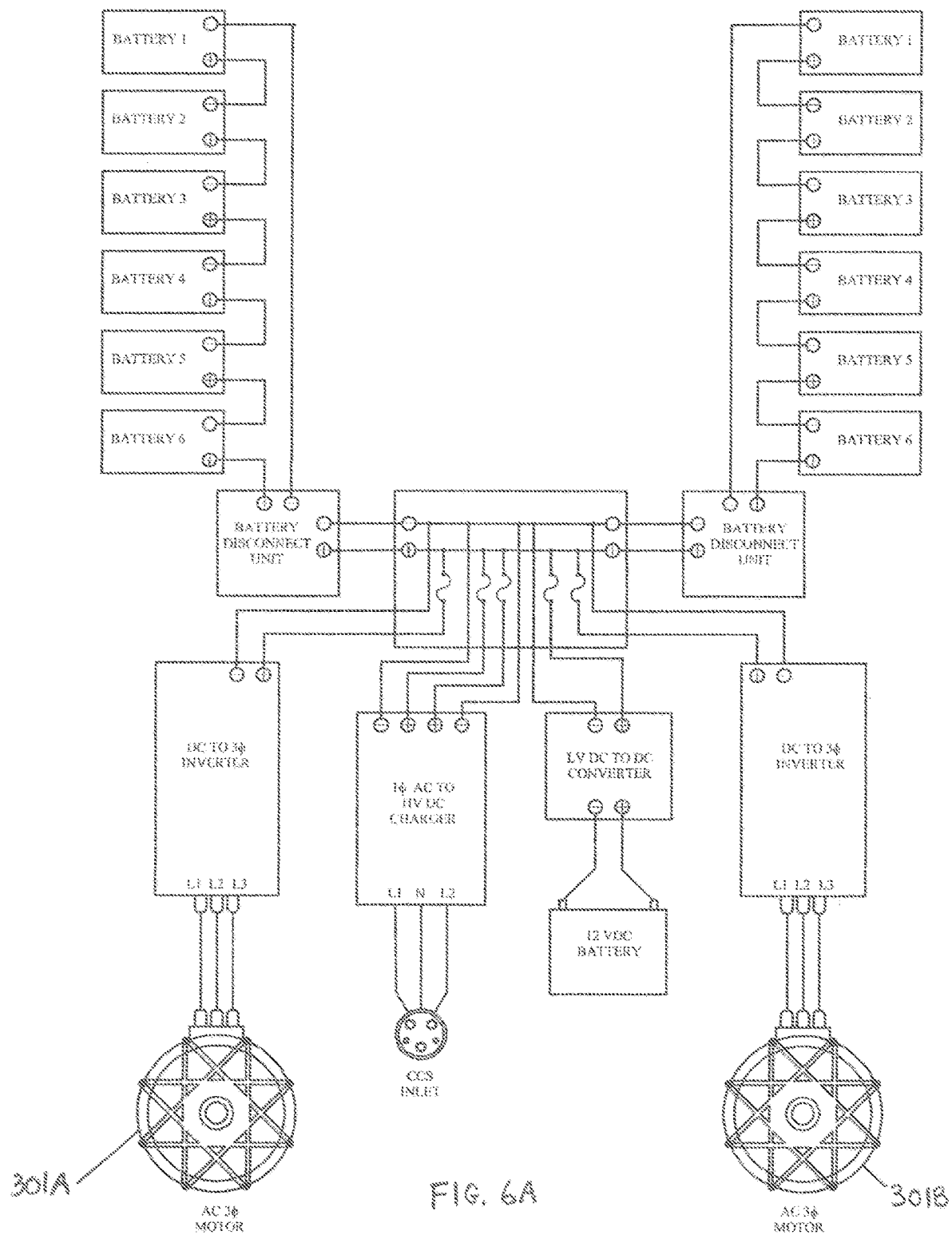
FIG. 6A presents a diagram of an outboard boat electrical power distribution system of the present invention.
Figure 6B:
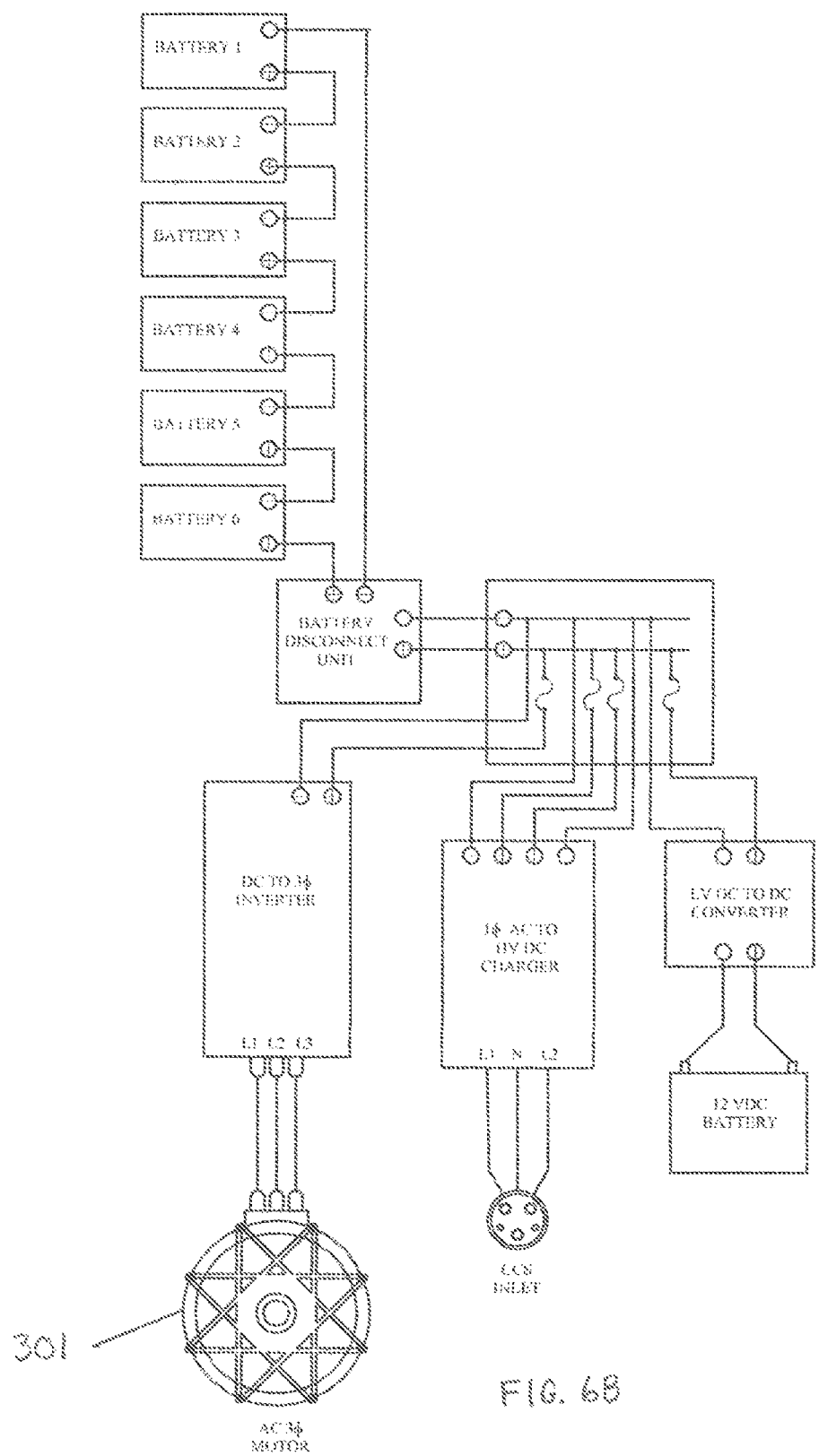
FIG. 6B presents a diagram of an outboard boat electrical power distribution system of the present invention.
Figure 10:
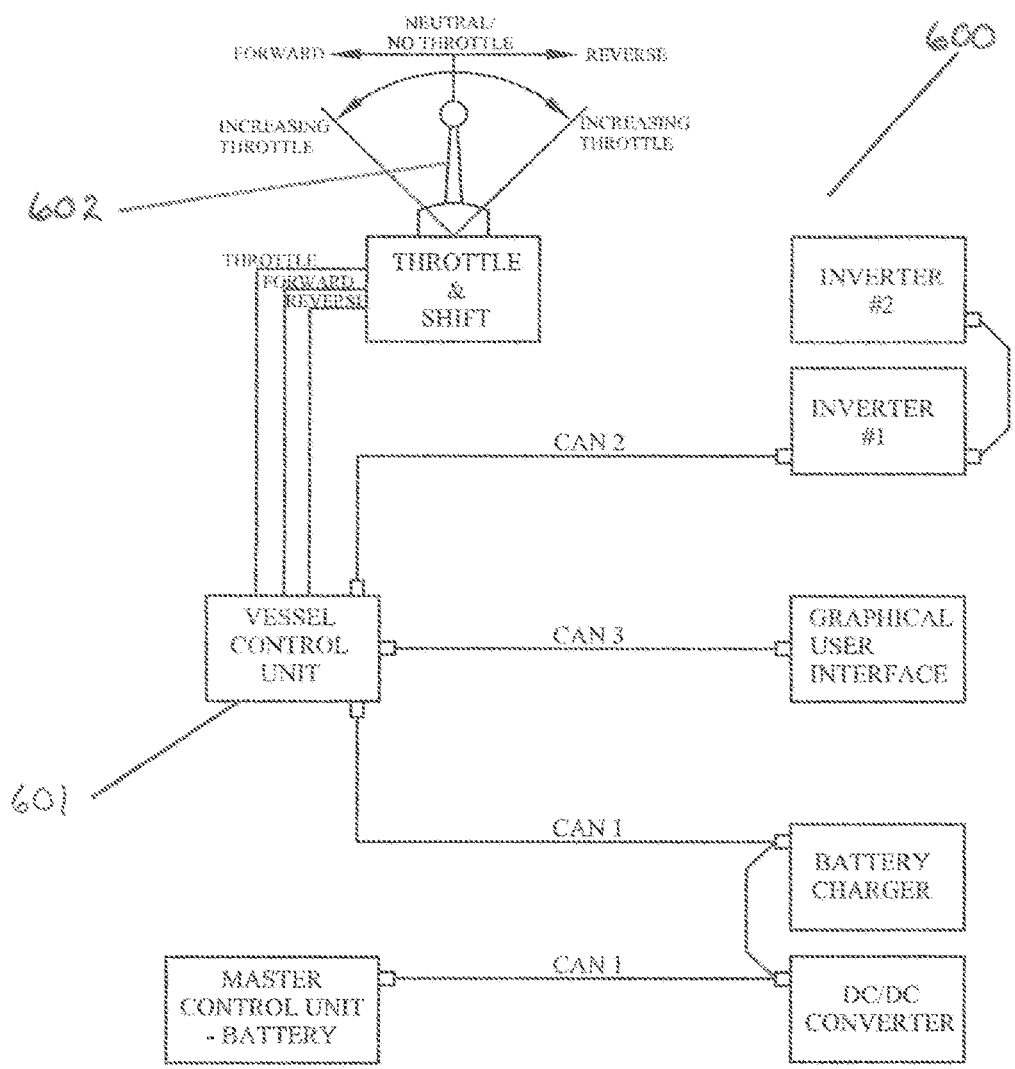
FIG. 10 presents a diagram of the control system of the present invention.

The subsystems further include a control system (600), as shown in FIG. 5 and FIG. 10, which includes at least a communication system/vessel control unit (601) and a throttle (602) to direct the operation of boat subsystems.

Specifically, the control system (600) directs the electrical power distribution system (500) to increase, decrease, or suspend electrical power (including at least current, voltage, frequency, or phase) to the transmission system (400), in response to signals from the throttle (602) and communication system (601).

Operation of the axial flux motor/generator (301) is adjusted via the throttle (602) which sends command and control signals to control system (600). The control system (600) uses, as applicable, Controller Area Network (CAN) bus protocols (including at least CAN 2.0 and CAN FD—Flexible Data-Rate), the National Marine Electronics Association (NMEA) standard 2000 and NMEA 0183 standard. Additionally, as needed, vehicle control communications can be performed using Bluetooth, WiFi, 5G thru IG, Near Field Communications (NFC), Satellites, Optics, and other known technologies.

The Fluid Management System

Figure 7:
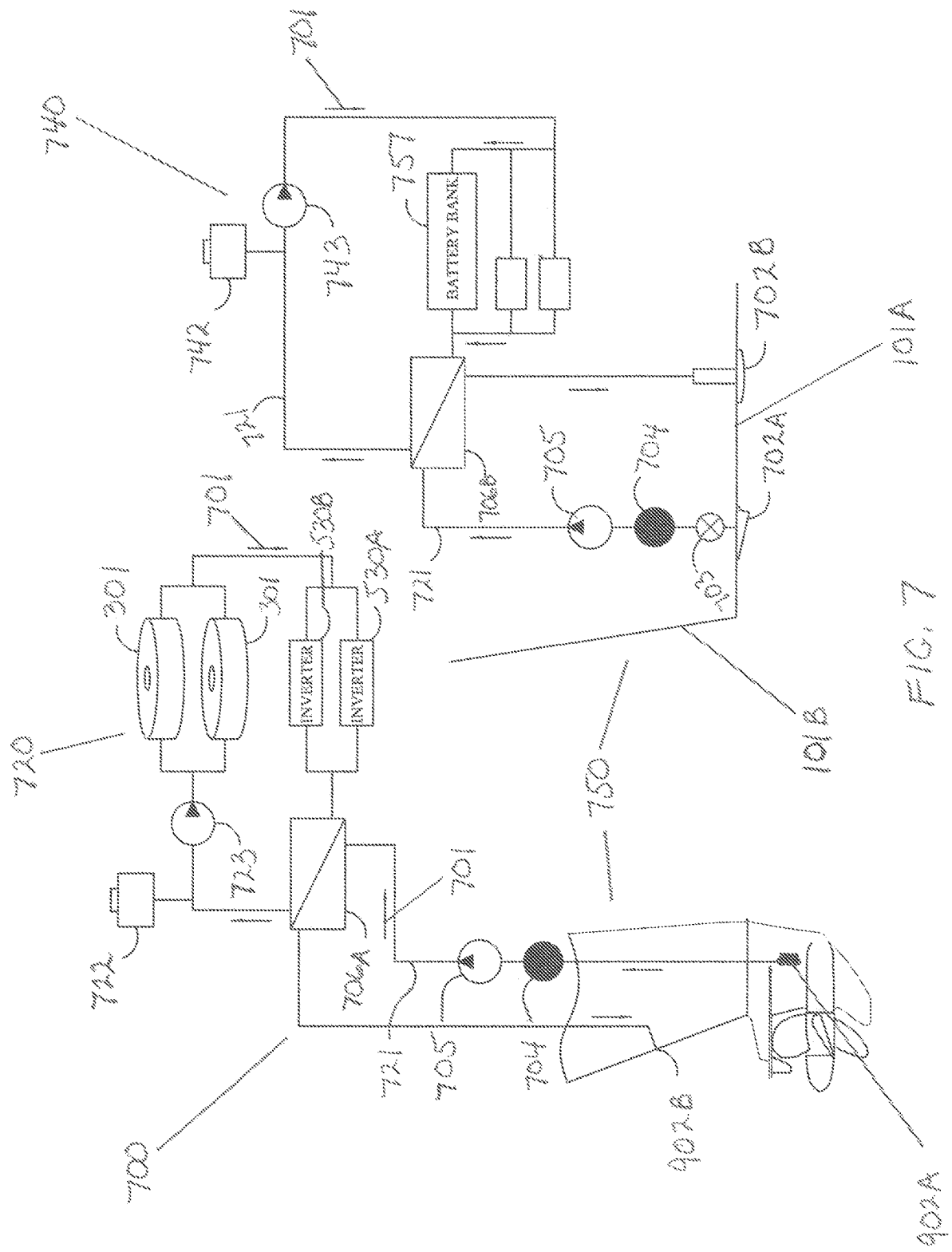
FIG. 7 presents diagram of the outboard Cooling System of the present invention.
Figure 8:
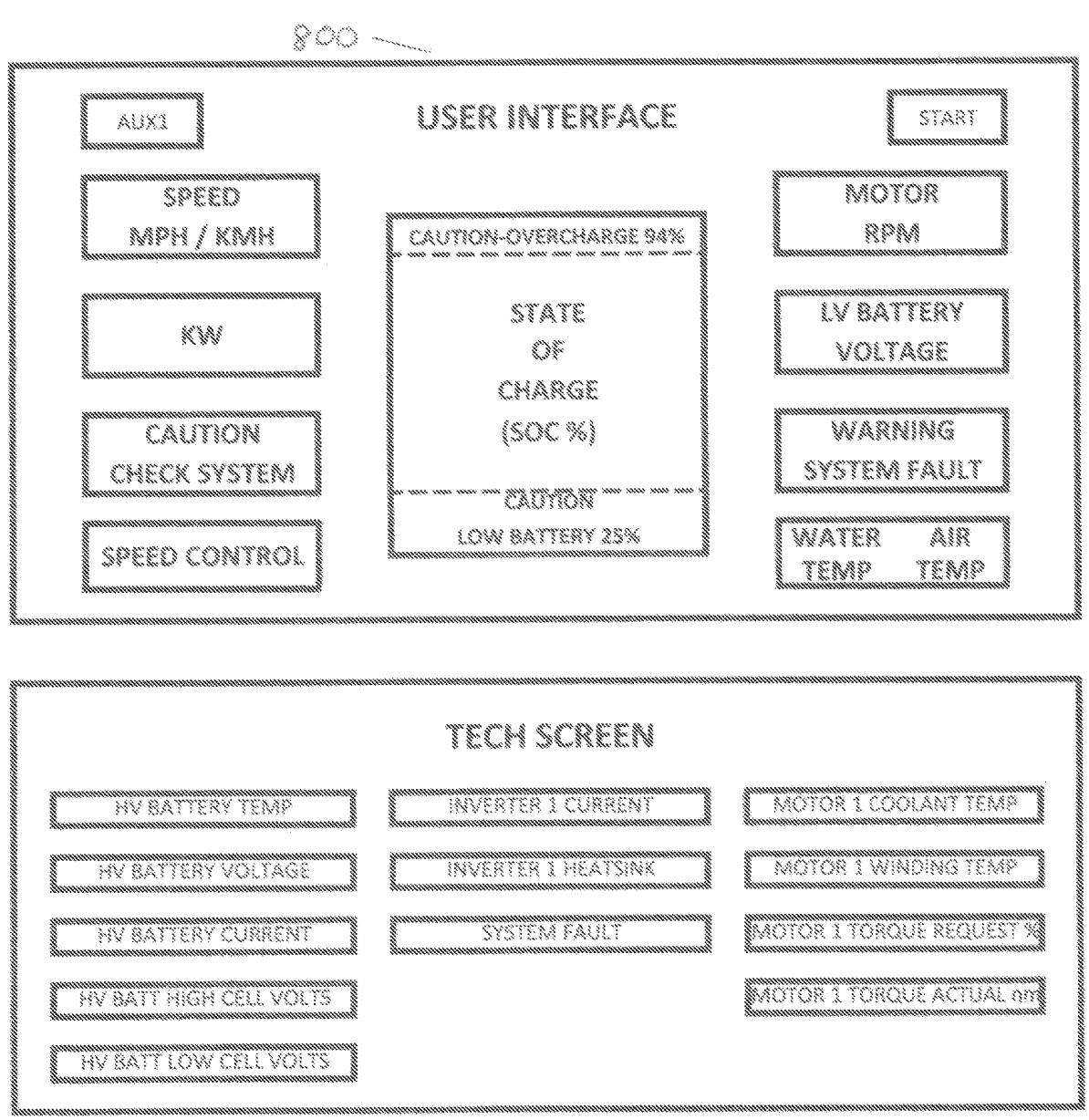
FIG. 8 presented and exemplary user interface of the present invention.

The Axial Flux Outboard Propulsion System 100 includes a fluid management system (700) for cooling components of the outboard propulsion system and as shown in FIG. 7, includes a raw water subsystem (750), a leg cooling subsystem (720), and a battery cooling subsystem (740) and provides independent, autonomous cooling of the separate cooling subsystems. The fluid management system (700) includes as least one fluid flow path (701) for circulating cooling fluid and uses a variety of fluids including raw water intake fluid (such as raw water) from leg ports (902, 902A, 902B) provided on Leg (900) and boat ports (702) provided on the boat hull (101A).

Temperature sensors (not shown) are distributed throughout the fluid management system (700) to provide temperature information of the applicable fluids or the temperature of system elements.

Since in normal usage the Axial Flux Outboard Propulsion System 100 is remotely attached to a battery unit, the fluid management system (700) is configured to provide cooling to both a Leg Cooling Subsystem (720) which cools the torque delivery hardware as well as a Battery Cooling Subsystem (740) which cools the electrical power delivery hardware.

The Leg Cooling Subsystem (720) including at least one leg inlet port (902A), at least one fluid flow path (701), at least one intake circuit pump (705), at least one motor cooling heat exchanger (706A), at least one motor cooling circulating pump (723), at least one motor cooling reservoir (722), and at least one leg outlet port (902B), and a Battery Cooling Subsystem (740) including at least one boat inlet port (702A), at least one intake circuit pump (705), at least one battery cooling heat exchanger (706B), and at least one battery cooling circulating pump (743), at least one battery cooling reservoir (742), and boat port (702B).

Further the fluid management system (700) subsystems use a predetermined Water, Ethanol, Glycol (WEG) solution, and/or a predetermined Dielectric Oil solution. It is understood the choices of features such as fluid chosen, fluid path elements, and equipment for monitoring and/or controlling the fluid flow is made in consideration of the cooling or heating requirements as presented by the fluid management system component manufacturers.

Once the boat is lowered into a body of water (such as a lake) the boat ports (702) below the waterline direct or push raw water into a hull boat port (702) and into the raw water subsystem (750) of the fluid management system (700).

In the Battery Cooling Subsystem (740) operation, within the raw water subsystem (750), a seacock valve (703) is used to control the flow of raw water further into the fluid management system (700). With the seacock valve (703) closed, no raw water can further enter the fluid management system (700) from the boat port (702). With the seacock valve (703) open, raw water can further enter the fluid management system (700) from the boat port (702). A sea strainer (704) is provided in the fluid flow path (701) after the seacock valve (703) to minimize foreign objects entering the raw water subsystem (750) with the raw water.

After the raw water is strained of debris an intake circuit pump (705) pumps/directs the raw water (or other fluid) to a heat exchanger (706B) where the raw water impinges on surfaces within the heat exchanger (706B) and draws heat away from the internal heat exchanger surfaces. The raw water enters the heat exchanger at a lower temperature than it is when the water exits the heat exchanger. This warmed raw water is expelled from the heat exchanger (706B) along a fluid flow path (701) that exits the boat hull through a boat port (702).

In the leg cooling subsystem (720) raw water enters the fluid management system (700) from the boat port (902A) and an intake circuit pump (705) pumps/directs the raw water (or other fluid) to a heat exchanger (706A) where the raw water impinges on surfaces within the heat exchanger (706A) and draws heat away from the internal heat exchanger surfaces. The raw water enters the heat exchanger at a lower temperature than it is when the water exits the heat exchanger. This warmed raw water is expelled from the heat exchanger (706A) along a fluid flow path (701) that exits the leg outlet port {902B).

Within the motor cooling subsystem (720) the working fluid (721) is determined based on the specifications provided by the motor manufacturer to optimize motor operation. It is understood changes in the number of motors of the size or features of a motor may require appropriate changes to the motor cooling subsystem (720).

In typical operation, the motor cooling subsystem circulating pump (723) continually circulates the working fluid (721) within the motor cooling subsystem (720). The reservoir (722) provides a high enough fluid level buffer to maintain a constant flow of circulating working fluid (721). As the working fluid (721) flows through the interior of each axial flux motor (301) the fluid draws heat from the motor components. The heated working fluid (721) exits the axial flux motor (301) and is directed through the heat exchanger (706A) where the heated working fluid (721) transfers its heat to the cooler raw water circulating within the raw water subsystem (750).

The battery cooling subsystem (740)—(which is electronically monitored/controlled by the control system 600)—includes a battery cooling subsystem reservoir (742), battery cooling subsystem circulating pump (743), and a battery cooling subsystem heat exchanger (706B). The battery cooling system (740) cools battery system components (757) which may include, among other things, an on-board charger, a de/de converter, inverters, and banks of batteries.

Within the battery cooling subsystem (740) the working fluid is determined based on the specifications provided by the battery systems manufacturer to optimize battery operation. It is understood changes in the number of batteries, their size, or features may require appropriate changes to the battery cooling subsystem (740).

In typical operation the battery cooling subsystem, the circulating pump (743) continually circulates the working fluid (721) within the battery cooling subsystem (740). The reservoir (742) provides a high enough fluid level buffer to maintain a constant flow of circulating working fluid (721). As the working fluid (721) flows through the interior of each battery system component (757) the fluid draws heat from the respective components. The heated working fluid (721) exits the battery system components (757) and is directed through the heat exchanger (706B) where the heated working fluid (721) transfers its heat to the cooler raw water circulating within the raw water subsystem (750).

More particularly in the preferred embodiment the traction system (300) includes a first axial flux electric motor/generator (301A) positioned adjacent to a second axial flux electric motor/generator (301B). The first and second motor/generator (301A, 301B) can operate in unison or independent of each other, as directed by the control system (600).

As shown in FIG. 1A-FIG. 1D, the preferred embodiment, traction torque is provided via a series of motor/generators which can operate independently or in unison. In this embodiment, as shown in FIG. 1B, when at least two motor/generators are combined in series, each motor/generator is poisoned on a common through shaft (410) of appropriate length. Further motor/generators may be removably add to the series and positioned on or removed from the common through shaft (410).

General Theory of Operation as Used with a Boat

The Axial Flux Outboard Propulsion System 100 is operated in a variety of modes as presented in FIG. 9A-FIG. 9C.

Particularly the use of two axial flux electric machines provides a unique driveline set up for an outboard motor (compare FIG. 1A-1B, to FIG. 2A-2B). Axial flux motor #1 is the primary traction motor that gives a boater the benefits of 100% EV propulsion (i.e. emission free, quiet, high constant torque, lightweight, high rpm) and fully powers the alternate embodiment which uses a single axial flux motor/generator (301) and, as shown in the preferred embodiment, engagement of axial flux motor/generator #2 provides additional traction power to the transmission shaft (410). During specific operation modes such as the acceleration mode, each axial flux motor generator(s) is selectively enabled and/or engaged to provide additional traction power.

FIG. 9A-FIG. 9C presents the condition of the core relevant components of each embodiment in relevant state. The sequence to follow for each embodiment is from operation Mode 1 through operation Mode 8. Concurrently TO-T3 is provided to try and simulate throttle movements in the real world uses where boaters do not particularly follow a sequential Mode 1-Mode 8 pattern when boating.

FIG. 9A-FIG. 9C presents tables which indicate the status of the axial flux outboard propulsion system during various stages of operation. Importantly, note that during specified stages axial flux motor/generators (301) may be present but enabled (where the axial flux motor/generator IS powered on and available for control commands), disabled (where the axial flux motor/generator IS NOT powered on and/or NOT available for control commands), disengaged (where the axial flux motor/generator IS NOT providing torque to the applicable shaft) or engaged (where the axial flux motor/generator IS providing torque to the applicable shaft), charging or discharging, applying traction or not among other conditions.

Of particular note is that each axial flux motor/generator (301) can be used as either a motor—applying torque or as a generator which is driven by a source of torque.

Further, the axial flux motor/generators (301) can be selectively operated as generators for at least a portion of their usage time.

Selection of the torque and power engagement of the transmission system 400 is performed via the throttle (602). Operation Modes of each embodiment are provided in FIG. 9A-FIG. 9C. The operational modes selectable by the throttle and programmed into the control system 600 are listed below with status information of the relevant key system components.

1. Startup (Neutral—READY STATE)

For Axial Flux Outboard Propulsion System 100 startup as used with a boat, referred to herein as TO (throttle is positioned straight up in neutral), the subsystems are turned on and provided time to stabilize as applicable. For example, cooling loops circulate fluid to cool the batteries and the inverters and motor/generators.

Thus, upon initial startup, the applicable subsystems are turned on however the traction system (300) is not yet engaged nor are the motor/generator motors (301) on.

2. Idle Speed Less than 5 Mph

After the subsystems are appropriately initiated, the boater shifts the throttle (602) from neutral position (T0) to a forward idle detent position (T1), to slowly guide the boat forward. The boater may also shift the throttle (602) to a reverse idle detent to slowly idle backward and can increase reverse speed by moving the throttle (602) further back.

Note, as shown in FIG. 9A, for the transition from neutral position (T0) to a forward idle detent position (T1), MOTOR 1 turned on and provides traction.

3. Acceleration (0-60 mph)

The boater can adjust the boat running speed (acceleration), referred to herein as T2, as desired by pushing the throttle (602) forward to increase boat speed or by pulling the throttle (602) back to decrease boat speed. Throttle (602) detent positions (not shown) are provided to incrementally adjust the boat speed.

As shown in FIG. 9A-9C, in this mode the boater can employ as many motors as available for the desired speed. Some motor(s) can be engaged while others may be completely disabled, and the optimum motor usage configuration can change dynamically as needed.

4. Trolling Mode—(Approximately 10 Mph)

In the trolling mode (T3) propulsion is primarily provided by a single, pair, or more motor/generator combinations. Basically the 100% electric embodiments may use one or more motor/generators. In this mode the batteries are discharging to provide the require energy to the motor/generator.

In the exemplary usage in the trolling mode as shown in FIG. 9B, two axial flux motor generators are providing traction.

5. Trolling Mode II—(Approximately 10 Mph)

In this mode, as shown in FIG. 9B at least one motor/generator provides the traction/torque to propel the boat.

6. Wakeboard/Tube Mode (Approximately 22 Mph)

This mode, as shown in FIG. 9B, is substantially the same as Trolling Mode II except at a higher speed. This mode is characteristic of the speed at which boaters who are wakeboard or tubing would use the boat.

In this mode, as shown in FIG. 9B at least one motor/generator provides the traction/torque to propel the boat.

7. Cruise Mode (23 Mph and Up)

This mode as shown in FIG. 9C is substantially the same as the Wakeboard/Tube mode except at a higher speed. This mode is characteristic of the speed at which boaters may be leisurely cruising.

In this mode, as shown in FIG. 9C at, least one motor/generator provides the traction/torque to propel the boat.

8. Wide Open Throttle (WOT)

In this mode the boat is driven more aggressively, and every available motor/generator is in the enabled/engaged mode thereby creating a maximum traction/torque correspondingly creating maximum discharge of the batteries.

In this mode, as shown in FIG. 9C all available axial flux motor/generators provide the traction/torque to propel the boat.

Where applicable an Internal Combustion Engine (not shown) may be engaged to supply traction/torque in addition to the traction/torque of the motor(s)/generator(s).

Preset Speeds

Using the User interface (800) (see FIG. 8) boaters can maintain boat speed and enter a preset speed limit or manually adjusted boat speed range (including using a control system algorithm or GPS speed control, such as to maintain the boat under 5 mph or near 10.8 mph for wake surfing).

Back to Idle

From the trolling mode speed (T3) boaters can shift the throttle (602) to decelerate the boat back into Idle or accelerate back up to higher speeds. When the boat is shifted back into Neutral (T1 to T0) the engagement of the motor/generator(s) (301) is released.

System Shut Off

After shifting to Neutral the boater can turn the boat off. The system may include a shut-down delay allowing the subsystems to shut down in an organized manner.

General Subsystems and Operations information

Further, it is envisioned supplemental propulsive force elements may be provided by an engine (internal combustion, rotary, Stirling, steam, nucleonic, microwave, human powered, pneumatic, hydraulic, wind, biofuel, microbial, and aquatic, at least).

CONCLUSION

The foregoing disclosure is sufficient to enable one having skill in the art to practice the invention without undue experimentation and provides the best mode of practicing the invention presently contemplated by the inventor. While there is provided herein a full and complete disclosure of the preferred embodiments of this invention, it is not intended to limit the invention to the exact construction, dimensional relationships, and operation shown and described. Various modifications, alternative constructions, changes, and equivalents will readily occur to those skilled in the art and may be employed, as suitable, without departing from the true spirit and scope of the invention. Such changes might involve alternative materials, components, structural arrangements, sizes, shapes, forms, functions, operational features, or the like.

Accordingly, the proper scope of the present invention should be determined only by the broadest interpretation of the appended claims so as to encompass all such modifications as well as all relationships equivalent to those illustrated in the drawings and described in the specification.

The invention claimed is:

1. An electric outboard motor for an electric boat comprising:
a traction system for generating torque, the traction system including at least one axial flux electric traction motor/generator;
a transmission system for transmitting torque, the transmission system including at least an upper drive shaft, a gearbox, a propeller drive shaft, and a propeller;
a transmission leg for supporting the at least one axial flux electric traction motor/generator,
an electrical power distribution system for storing and distributing electrical power, the electrical power distribution system including at least one battery; and
a control system, the control system including at least a communication system and a throttle that together direct the operation of boat subsystems,
wherein the control system directs the electrical power distribution system to adjust electrical power delivered to the traction system in response to signals from the throttle and communication system;
wherein the boat subsystems include at least the traction system, the transmission system, the electrical power distribution system, and the control system; and wherein the transmission leg encloses at least the upper drive shaft, the gearbox, and the propeller drive shaft.

2. The electric outboard motor for an electric boat of claim 1, wherein the at least one axial flux electric traction motor/generator is a solitary axial flux electric traction motor/generator.

3. The electric outboard motor for an electric boat of claim 1, wherein the traction system is a purely electric motor system.

4. The electric outboard motor for an electric boat of claim 1, further comprising a transmission leg and an upper shell covering for supporting and enclosing the at least one axial flux electric traction motor/generator.

5. The electric outboard motor for an electric boat of claim 1, further comprising a transmission leg for supporting the at least one axial flux electric traction motor/generator and including a transom mount, wherein the transom mount is configured to fix the electric outboard motor to the transom of the electric boat.

6. The electric outboard motor for an electric boat of claim 1, wherein the upper drive shaft has a first axis of rotation and the propeller drive shaft has a second axis of rotation; and wherein the first axis of rotation is not collinear with the second axis of rotation.

7. The electric outboard motor for an electric boat of claim 6, wherein the first axis of rotation is angled from the second axis of rotation, the angle being between 0 and 180 degrees, not inclusive.

8. The electric outboard motor for an electric boat of claim 6, further comprising a transmission leg for supporting the at least one axial flux electric traction motor/generator and including a transom mount, wherein the transom mount is configured to fix the electric outboard motor to the transom of the electric boat.

9. An electric outboard motor for an electric boat comprising:
a traction system for generating torque, the traction system including at least one axial flux electric traction motor/generator;
a transmission system for transmitting torque, the transmission system including at least an upper drive shaft, a gearbox, a propeller drive shaft, and a propeller;
an electrical power distribution system for storing and distributing electrical power, the electrical power distribution system including at least one battery; and
a control system, the control system including at least a communication system and a throttle that together direct the operation of boat subsystems,
wherein the control system directs the electrical power distribution system to adjust electrical power delivered to the traction system in response to signals from the throttle and communication system;
wherein the boat subsystems include at least the traction system, the transmission system, the electrical power distribution system, and the control system;
wherein the upper drive shaft has a first axis of rotation and the propeller drive shaft has a second axis of rotation; and
wherein the first axis of rotation is not collinear with the second axis of rotation.

10. The electric outboard motor for an electric boat of claim 9, wherein the at least one axial flux electric traction motor/generator is a solitary axial flux electric traction motor/generator.

11. The electric outboard motor for an electric boat of claim 9, wherein the traction system is a purely electric motor system.

12. The electric outboard motor for an electric boat of claim 9, further comprising a transmission leg for supporting the at least one axial flux electric traction motor/generator and including a transom mount, wherein the transom mount is configured to fix the electric outboard motor to the transom of the electric boat.

13. The electric outboard motor for an electric boat of claim 9, further comprising a transmission leg and an upper shell covering for supporting and enclosing the at least one axial flux electric traction motor/generator.

14. The electric outboard motor for an electric boat of claim 9, wherein the first axis of rotation is perpendicular to the second axis of rotation.

15. The electric outboard motor for an electric boat of claim 14, further comprising a transmission leg for supporting the at least one axial flux electric traction motor/generator and including a transom mount, wherein the transom mount is configured to fix the electric outboard motor to the transom of the electric boat.

16. The electric outboard motor for an electric boat of claim 9, wherein the first axis of rotation is angled from the second axis of rotation, the angle being between 0 and 180 degrees, not inclusive.

17. The electric outboard motor for an electric boat of claim 16, further comprising a transmission leg for supporting the at least one axial flux electric traction motor/generator and including a transom mount, wherein the transom mount is configured to fix the electric outboard motor to the transom of the electric boat.

18. An electric outboard motor for an electric boat comprising:
a traction system for generating torque, the traction system including at least one axial flux electric traction motor/generator;
a transmission system for transmitting torque, the transmission system including at least an upper drive shaft, a gearbox, a propeller drive shaft, and a propeller;
a transmission leg for supporting the at least one axial flux electric traction motor/generator and including a transom mount;
an electrical power distribution system for storing and distributing electrical power, the electrical power distribution system including at least one battery; and
a control system, the control system including at least a communication system and a throttle that together direct the operation of boat subsystems,
wherein the control system directs the electrical power distribution system to adjust electrical power delivered to the traction system in response to signals from the throttle and communication system;
wherein the boat subsystems include at least the traction system, the transmission system, the electrical power distribution system, and the control system; and
wherein the transom mount is configured to fix the electric outboard motor to the transom of the electric boat.

19. The electric outboard motor for an electric boat of claim 18, wherein the at least one axial flux electric traction motor/generator is a solitary axial flux electric traction motor/generator.

20. The electric outboard motor for an electric boat of claim 18, wherein the traction system is a purely electric motor system.

* * * * *